US008172050B2

(12) United States Patent
Mikura et al.

(10) Patent No.: US 8,172,050 B2
(45) Date of Patent: May 8, 2012

(54) DISC BRAKE COVER STRUCTURE AND VEHICLE

(75) Inventors: Keita Mikura, Wako (JP); Tomohiro Fuse, Wako (JP); Kazuhito Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 577 days.

(21) Appl. No.: 12/402,135

(22) Filed: Mar. 11, 2009

(65) Prior Publication Data
US 2009/0266655 A1 Oct. 29, 2009

(30) Foreign Application Priority Data

Apr. 24, 2008 (JP) ................................ 2008-114427

(51) Int. Cl.
*F16D 65/00* (2006.01)
(52) U.S. Cl. ................... 188/218 A; 188/264 W
(58) Field of Classification Search .............. 188/218 A, 188/18 A, 264 W
See application file for complete search history.

(56) References Cited

U.S. PATENT DOCUMENTS

| 4,456,099 A * | 6/1984 | Kawaguchi | 188/18 A |
| 4,653,764 A * | 3/1987 | McNeill | 188/218 A |
| 2008/0053762 A1* | 3/2008 | Nakamura et al. | 188/218 A |

FOREIGN PATENT DOCUMENTS

JP 60-67245 4/1985

* cited by examiner

*Primary Examiner* — Melanie Torres Williams
(74) *Attorney, Agent, or Firm* — Ditthavong Mori & Steiner, P.C.

(57) ABSTRACT

A disc brake cover structure for a vehicle includes a protection cover and a wheel collar. The protection cover is to protect a rotor of a disc brake disposed at a front wheel of a vehicle. The front wheel is rotatably supported via a support shaft between first and second axle holders disposed at a front fork. A wheel collar is to be supported on the support shaft to position the front wheel and connected to the protection cover. The wheel collar is arranged to be sandwiched between a hub of the front wheel and either one of the first and second axle holders.

20 Claims, 12 Drawing Sheets

DISC BRAKE COVER STRUCTURE AND VEHICLE

CROSS-REFERENCE TO RELATED APPLICATIONS

This application is claims priority under 35 U.S.C. §119 to Japanese Patent Application. No. 2008-114427, filed Apr. 24, 2008. The contents of this application are incorporated herein by reference in their entirety.

BACKGROUND OF THE INVENTION

1. Field of the Invention

The present invention relates to a disc brake cover structure and a vehicle.

2. Discussion of the Background

A known motorcycle includes a wheel supported on a leading end of a pair of left and right front forks serving also as a front cushion, a disc brake rotor (also known as brake disc) disposed at a hub of the wheel, and a caliper disposed on the side of the front forks, the caliper for pressing a brake pad against the rotor. A vehicle of this type often includes a disc brake cover for protecting the disc brake. For example, a cover main body of the disc brake cover is formed into an arc and the cover main body is disposed on the front forks so as to cover an upward area of a rotor braking surface and the caliper (see, for example, Japanese Patent Laid-Open No. Sho 60-67245).

In the background-art arrangement, however, the disc brake cover is attached to the front forks at a plurality of positions, which makes removal or reinstallation of the disc brake cover troublesome. In addition, the background-art arrangement covers only the upward area of a rotor edge portion and the caliper, which can at times be insufficient as a protection around the disc brake.

If the disc brake cover is structured so as to cover the entire periphery of the rotor, the leading ends of the front forks, and the caliper in order to provide a sufficient protection around the disc brake, an increase in size and weight of the disc brake cover results, inviting an increase in diameter and the number of mounting positions of mounting bolts for supporting the cover.

SUMMARY OF THE INVENTION

According to one aspect of the present invention, a disc brake cover structure for a vehicle includes a protection cover and a wheel collar. The protection cover is to protect a rotor of a disc brake disposed at a front wheel of a vehicle. The front wheel is rotatably supported via a support shaft between first and second axle holders disposed at a front fork. A wheel collar is to be supported on the support shaft to position the front wheel and connected to the protection cover. The wheel collar is arranged to be sandwiched between a hub of the front wheel and either one of the first and second axle holders.

According to another aspect of the present invention, a vehicle includes a front wheel, a disc brake, a protection cover, and a wheel collar. The front wheel includes a hub and rotatably supported at the hub via a support shaft between first and second axle holders disposed at a front fork. The disc brake is disposed at the front wheel and includes a rotor. The protection cover is to protect the rotor of the disc brake. A wheel collar is supported on the support shaft to position the front wheel and connected to the protection cover. The wheel collar is arranged to be sandwiched between the hub of the front wheel and either one of the first and second axle holders.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
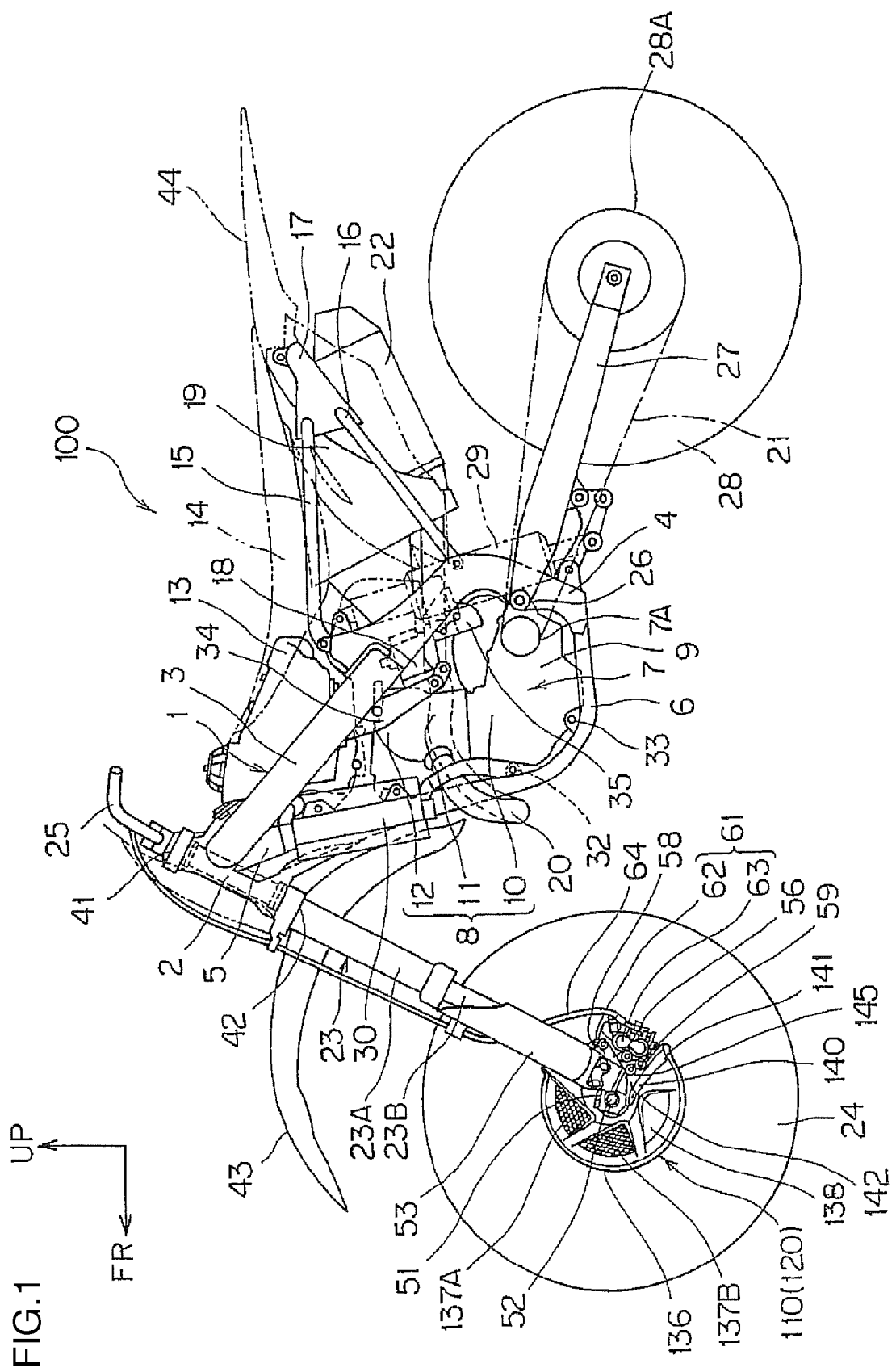
FIG. 1 is a side elevational view showing an off-road type motorcycle having a disc brake cover structure according to an embodiment of the present invention.

Embodiments will now be described with reference to the accompanying drawings, wherein like reference numerals designate corresponding or identical elements throughout the various drawings.

A specific embodiment to which the present invention is applied will be described below with reference to the accompanying drawings. Throughout the descriptions given hereunder, "longitudinal," "crosswise," "vertical," and other directional expressions are relative to the vehicle unless otherwise noted. In addition, in the drawings, an arrow FR indicates forward of the vehicle, an arrow LH indicates leftward of the vehicle, and an arrow UP indicates upward of the vehicle.

FIG. 1 is a side elevational view showing an off-road type motorcycle having a disc brake cover structure according to an embodiment of the present invention.

A motorcycle 100 has a vehicle body frame 1 that includes a head pipe 2, a main frame 3, a center frame 4, a down frame 5, and a lower frame 6 that are connected in a loop form. An engine 7 is supported inside the loop. Each of the main frame 3, the center frame 4, and the lower frame 6 comes in a pair of left and right members. In addition, the single head pipe 2 and the single down frame 5 are disposed to extend along a centerline in the vehicle body crosswise direction.

The main frame 3 extends from the head pipe 2 obliquely downwardly toward the rear straightways in a space upward of the engine 7 and connects to an upper end portion of the center frame 4 extending vertically in the rear of the engine 7. The down frame 5 extends from the head pipe 2 obliquely downwardly in a space forward of the engine 7 and connects to a front end portion of the lower frame 6 in a space forward of a cylinder 8 that extends upwardly from a crankcase 9 of the engine 7. The lower frame 6 bends downwardly of the crankcase 9 in a space forward of the crankcase 9 and extends substantially straightways toward the rear in a space underside the crankcase 9. The lower frame 6 has a rear end portion connected to a lower end portion of the center frame 4. A front end of a pair of left and right seat rails 15 connects to the upper end of the center frame 4. The seat rails 15 extend rearwardly and have rear ends thereof connected to a cross frame member 17. A pair of left and right rear frames 16 has a front end portion connected to an intermediate portion of the center frames 4. The rear frames 16 extend obliquely upwardly toward the rear and connect to the cross frame member 17.

The engine 7 is a water-cooled, four-cycle, single-cylinder engine. The cylinder 8 is disposed at a front portion of the crankcase 9 and has a cylinder axis slightly inclined forwardly. The cylinder 8 includes a cylinder block 10, a cylinder head 11, and a head cover 12, disposed in sequence from a lower portion thereof upward. Arranging the cylinder 8 substantially in an upright condition helps shorten the engine 7 in the longitudinal direction, making the engine 7 suitable for the off-road vehicle.

An exhaust pipe 20 that constitutes an exhaust system of the engine 7 is connected to a front portion of the cylinder 8. Specifically, the exhaust pipe 20 extends forwardly of the crankcase 9 from a front portion of the cylinder head 11 and bends to the right so as to avoid the down frame 5 before being routed along the right side of the vehicle body toward the rear. A muffler 22 is connected to a rear end of the exhaust pipe 20 and supported on the rear frames 16.

A fuel tank 13 supported by the main frames 3 is disposed upwardly of the engine 7. The fuel tank 13 includes a fuel pump disposed thereinside. Fuel inside the fuel tank 13 is supplied by the fuel pump to an injector (not shown) of a throttle body 18 connected to a rear portion of the cylinder 8 (a rear portion of the cylinder head 11) via a fuel supply pipe (not shown).

An occupant seat 14 extends from an upper rear portion of the fuel tank 13 toward a rear end of the seat rails 15 and is supported by the pair of left and right seat rails 15. An air cleaner case 19 is supported in a gap surrounded by the pairs of left and right seat rails 15 and rear frames 16. The air cleaner case 19 and the throttle body 18 constitute an intake system of the engine 7. Air cleaned by the air cleaner case 19 is supplied to the throttle body 18 and mixed with fuel, so that a mixture is drawn into the cylinder 8.

A pair of left and right front forks 23 is supported on the head pipe 2 via a top bridge 41 and an under bracket 42. A front wheel 24 supported at lower end portions of the front forks 23 is steered by a handlebar 25 attached to the top bridge 41. A so-called inverted front fork is used for the front fork 23, in which an inner tube 23B extending from an outer tube 23A is disposed on the side of the front wheel 24. An axle holder 51 is disposed at a front end of each of the left and right inner tubes 23B. The front wheel 24 is rotatably supported between the left and right axle holders 51 via an axle shaft (support shaft) 52.

A fork cover 53 that covers a lower portion of each of the front forks 23 has a lower portion fixed to each of the left and right axle holders 51 with a screw 54. The fork cover 53 extends upwardly along the front fork 23 so as to cover a vehicle body outward side peripheral surface of the inner tube 23B at the lower portion of the front fork 23, thereby protecting the inner tube 23B from, for example, pebbles or mud.

A front end portion of a rear arm 27 is swingably supported on the center frame 4 via a pivot shaft 26. A rear wheel 28 is supported on a rear end portion of the rear arm 27. A drive chain 21 is trained over a drive sprocket 7A disposed on the side of the engine 7 and a driven sprocket 28A disposed on the side of the rear wheel 28 to form a chain drive mechanism. This chain drive mechanism transmits power of the engine 7 to the rear wheel 28. A cushion unit 29 of a rear suspension is disposed between the rear arm 27 and the center frame 4.

In FIG. 1, reference numeral 30 denotes a radiator disposed at the right and left of the down frame 5; reference numerals 32 and 33 denote engine mount portions supporting a front portion and a lower portion of the engine 7, respectively; reference numeral 34 denotes an engine hanger that extends from the main frame 3 and supports the engine 7; reference numeral 35 denotes an electrical component case; reference numeral 43 denotes a front fender covering an upward space of the front wheel 24; and reference numeral 44 denotes a rear fender covering an upward space of the rear wheel 28. Note that the engine 7 is also supported by the center frame 4 via the pivot shaft 26.

Figure 2:
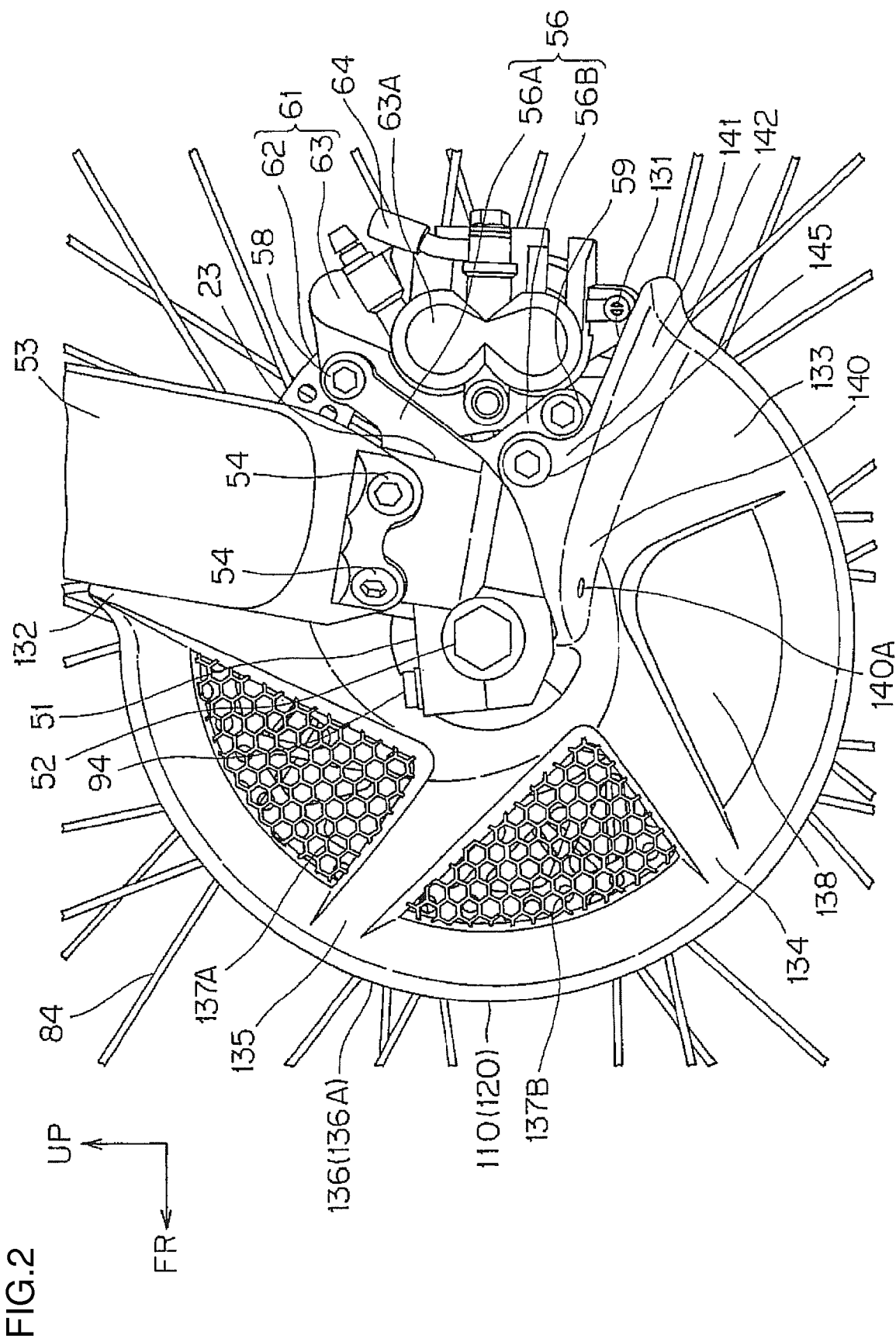
FIG. 2 is a side elevational view showing a front wheel disc brake and parts disposed therearound.

FIG. 2 shows a front wheel disc brake 61 and parts disposed therearound of the motorcycle 100. The front wheel disc brake 61 functions as a front wheel brake system that brakes the front wheel 24. The front wheel disc brake 61 includes a rotor 62 and a caliper 63. The rotor (also called brake disc) 62 is fixed to the front wheel 24. The caliper 63 is fixed to the front fork 23. The front wheel disc brake 61 further includes a disc brake cover 110 for protecting the rotor 62 and the caliper 63. In this front wheel disc brake 61, a front wheel braking operation performed by a rider (operating a brake lever not shown) is transmitted to the caliper 63 via a brake fluid in a brake hose 64 (see FIGS. 1 and 2) connected to the caliper 63, so that a resultant hydraulic pressure presses a brake pad inside the caliper 63 against the rotor 62 to thereby develop a braking force that brakes the front wheel 24.

The caliper 63 is supported by a caliper support portion 56 disposed at the axle holder 51 of the front fork 23 on the left-hand side of the vehicle body. The caliper support portion 56 includes an upper caliper support portion 56A and a lower caliper support portion 56B. The upper caliper support portion 56A and the lower caliper support portion 56B form a pair that extends to form substantially a V shape, vertically spaced apart from each other, from a back surface (surface on the rear side of the vehicle body) of the axle holder 51. A total of two bolts 58, 59 passed through leading ends of the upper and lower caliper support portions 56A, 56B support the caliper 63. In this case, the caliper 63 is supported such that a piston portion 63A of the caliper 63 is substantially disposed within a gap between the upper and lower caliper support portions 56A, 56B. Note herein that the piston portion 63A accommodates therein a piston that presses the brake pad mounted on the caliper 63 against the side of the rotor 62. Supporting an area near the piston portion 63A achieves an ample supporting force of the caliper 63.

Figure 3:
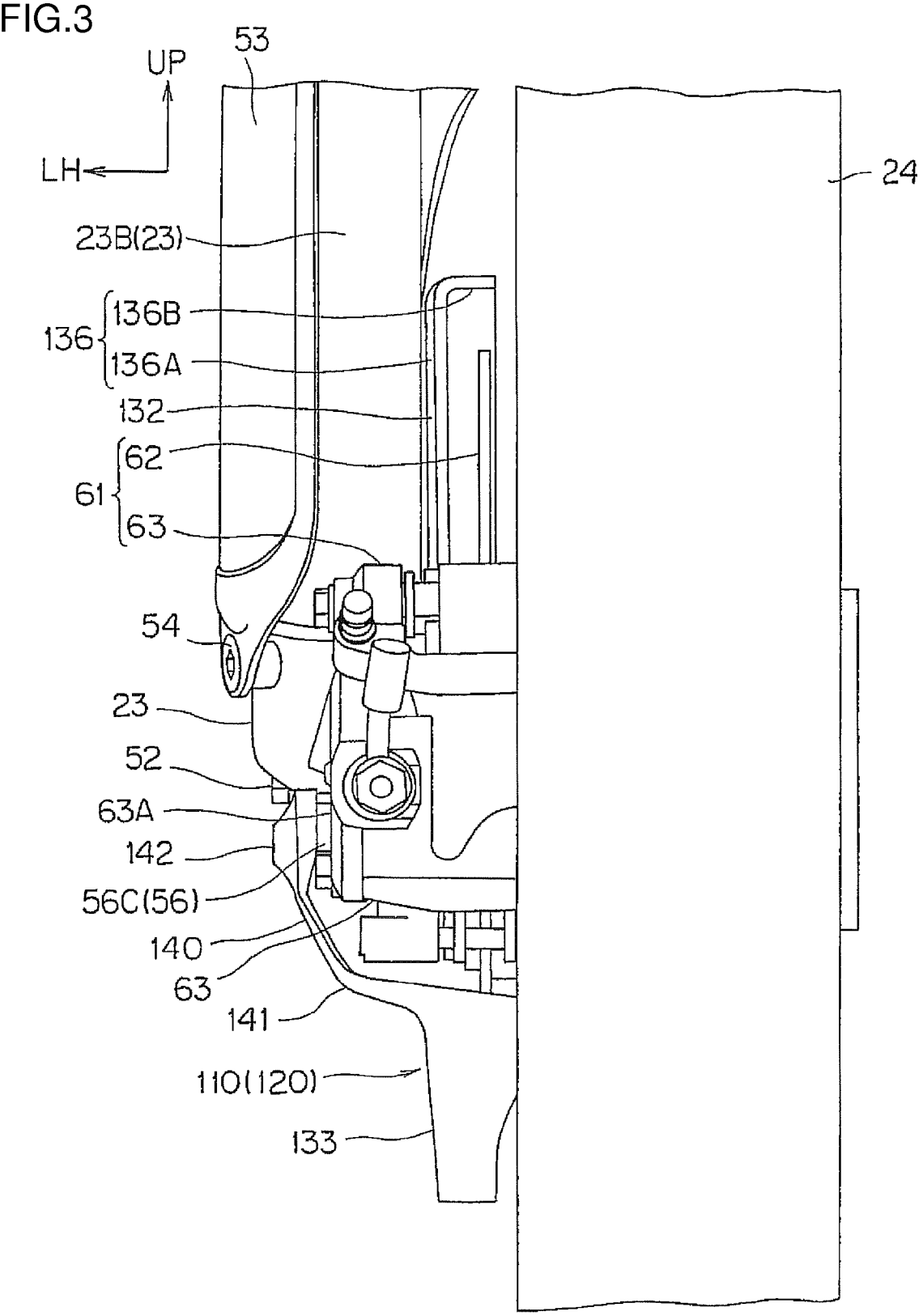
FIG. 3 shows the front wheel disc brake and the parts disposed therearound as viewed from the rear.

FIG. 3 shows the front wheel disc brake 61 and the parts disposed therearound as viewed from the rear. As shown in FIG. 3, the caliper 63 is supported by the caliper support portion 56 so as to be disposed inside an outside surface of the front fork 23. Accordingly, the front fork 23 and the fork cover 53 function as shielding members covering a forward space of the caliper 63, so that the fork cover 53 that covers the front fork 23 can serve also as a protection member that protects the caliper 63 from, for example, pebbles or mud from the front of the vehicle body. In addition, the axle holder 51 is also disposed forwardly of the caliper 63, so that the axle holder 51 can also reduce the likelihood of, for example, pebbles or mud contacting the caliper 63.

Figure 4:
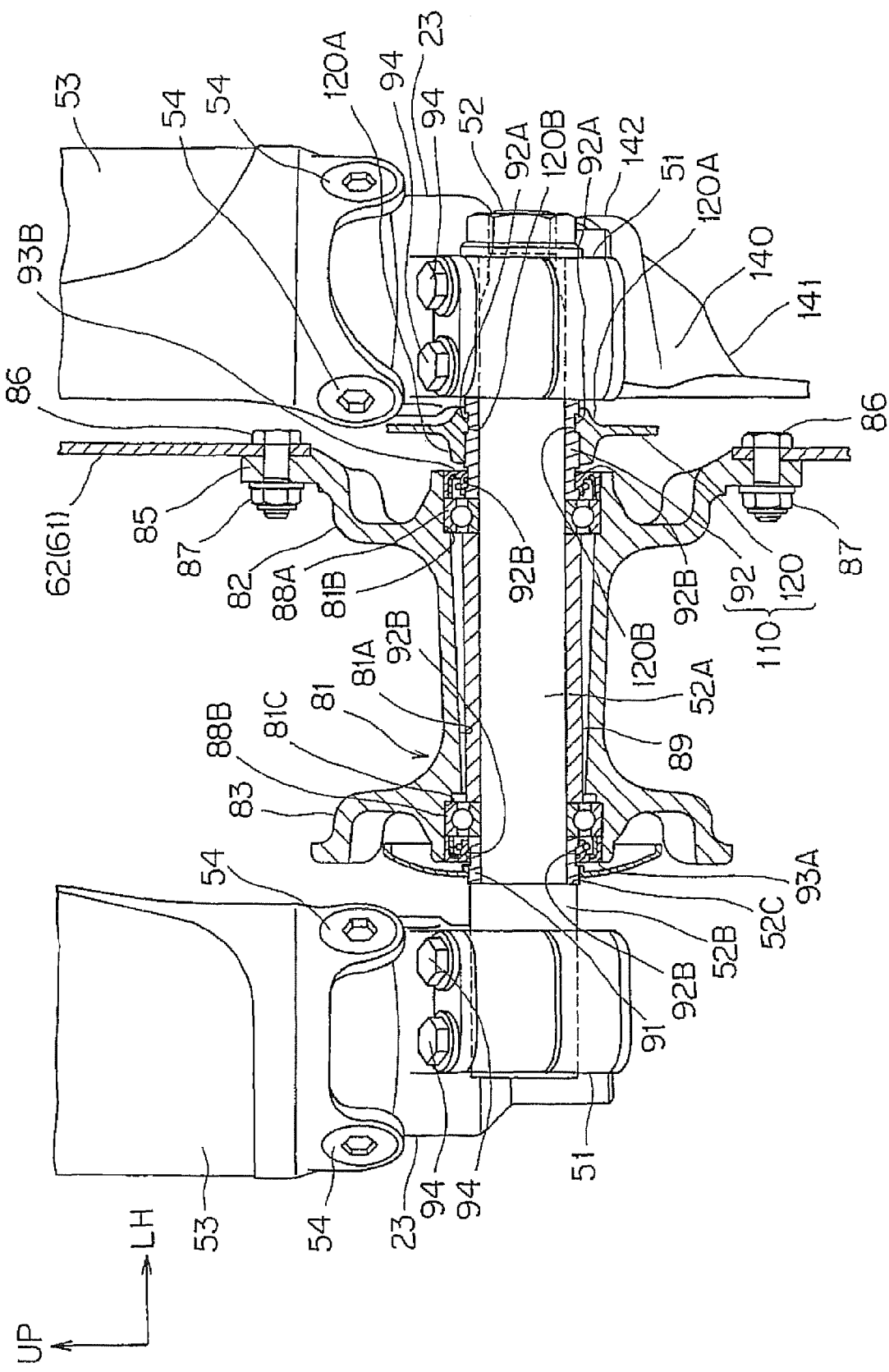
FIG. 4 shows a support structure for a front wheel.
Figure 5:
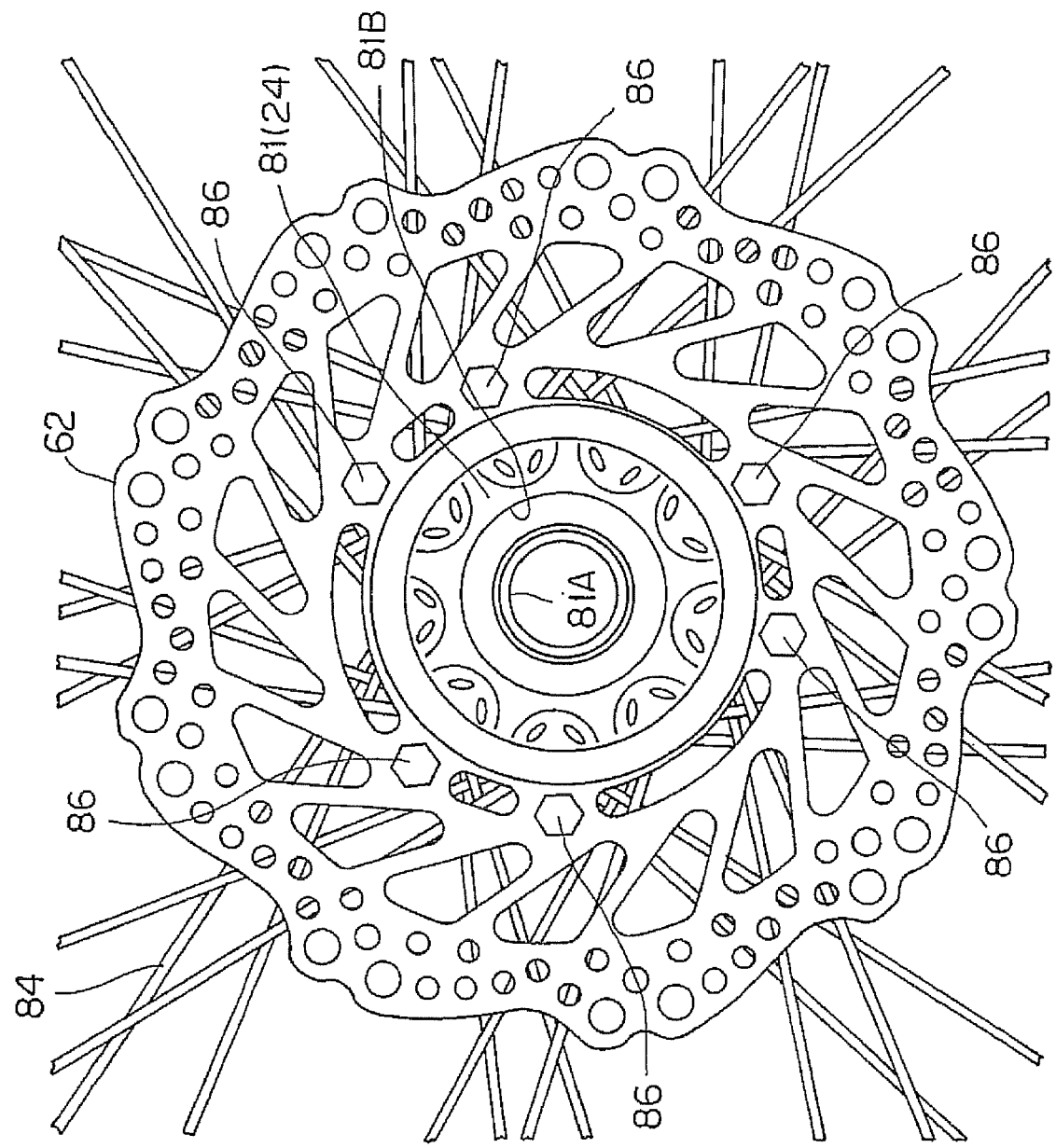
FIG. 5 is a side elevational view showing an area around a hub of the front wheel, together with a rotor.

FIG. 4 shows a support structure for the front wheel 24. FIG. 5 is a side elevational view showing an area around a hub 81 of the front wheel 24, together with the rotor 62. The motorcycle 100 according to the embodiment of the present invention incorporates a spoke wheel suitable for use in off-road vehicles for the front wheel 24 and the rear wheel 28. The front wheel 24 will be described. Referring to FIG. 4, the front wheel 24 includes annular portions 82, 83 extending circumferentially around the hub 81 on the left and right sides of the hub 81 through which the axle shaft 52 is passed. Referring to FIG. 5, each of a plurality of spokes 84 has a first end connected to the left and right annular portions 82, 83 and a second end connected to a rim (not shown) of the front wheel 24. This places the spokes 84 across the hub 81 and the rim and flexing of the spokes 84 reduces an impact force upon grounding from a jump.

Additionally, referring to FIG. 4, a rotor support portion 85 is formed on an outer peripheral portion of the annular portion 82 on one side (left-hand side of the vehicle body) of the hub 81. The rotor 62 is fixed to the rotor support portion 85 with a plurality of bolts 86 and nuts 87 (see FIG. 5).

Referring to FIG. 4, the hub 81 includes a through hole 81A and hole portions having a large diameter (hereinafter referred to as large-diameter hole portions) 81B, 81C. The axle shaft 52 is passed through the through hole 81A. The large-diameter hole portions 81B, 81C are formed coaxially with, and on the right and left sides of, the through hole 81A. The axle shaft 52 is supported for rotation via a pair of left and right bearings (ball bearings according to the embodiment of the present invention) 88A, 88B inserted in the left and right large-diameter hole portions 81B, 81C. A distance collar 89 through which the axle shaft 52 is passed is inserted between the pair of left and right bearings 88A, 88B. The distance collar 89 defines the distance between inner races of the pair of left and right bearings 88A, 88B.

Wheel collars (also called adjust collars) 91, 92 formed of metal are disposed between the hub 81 and a corresponding one of the left and right axle holders 51. The wheel collars 91, 92 correctly position the front wheel 24 in a vehicle width direction. More specifically, the wheel collar 91 on the right-hand side of the vehicle body is inserted between a step portion 52C that is formed by an intermediate shaft portion 52A of the axle shaft 52 and a large diameter portion 52B disposed on a leading end side of the axle shaft 52 and the bearing 88B disposed on the right-hand side of the hub 81. The hub 81 is positioned correctly relative to the axle shaft 52 by fastening the axle shaft 52 so as to allow no gap on both left and right sides of the wheel collar 91. Specifically, the wheel collar 91 is held in position by being clamped between the step portion 52C of the axle shaft 52 and the bearing 88B. In this case, the wheel collar 91 abuts on the inner race of the bearing 88B and is disposed in a non-contact fashion with respect to the hub 81 and an outer race of the bearing 88B which rotate during running. In addition, a dust seal 93A is disposed between an outer peripheral surface of the wheel collar 91 and an inner peripheral surface of the large-diameter hole portion 81C of the hub 81.

The wheel collar 92 on the left-hand side of the vehicle body, specifically, the wheel collar 92 on the side of the front wheel disc brake 61 is inserted between the bearing 88A on the left-hand side of the hub 81 and the left axle holder 51. The hub 81 is positioned correctly relative to the axle holder 51 by fastening the axle shaft 52 so as to allow no gap on both left and right sides of the wheel collar 92. Specifically, the wheel collar 92 is held in position by being clamped between the bearing 88A of the hub 81 and the axle holder 51.

Like the wheel collar 91, the wheel collar 92 is formed of metal having stiffness. The wheel collar 92, abutting on the inner race of the bearing 88A, is supported in a non-contact fashion with respect to the hub 81 and an outer race of the bearing 88A which rotate during running. In addition, a dust seal 93B is disposed between an outer peripheral surface of the wheel collar 92 and an inner peripheral surface of the large-diameter hole portion 81B of the hub 81. The front wheel 24 is accurately positioned in the crosswise direction by inserting the wheel collars 91, 92 on the right and left of the hub 81 as described above. Note that, in FIG. 4, reference numeral 94 denotes bolts for fastening vertically split axle holders 51 to thereby hold the axle shaft 52 with an adequate holding force.

Figure 6:
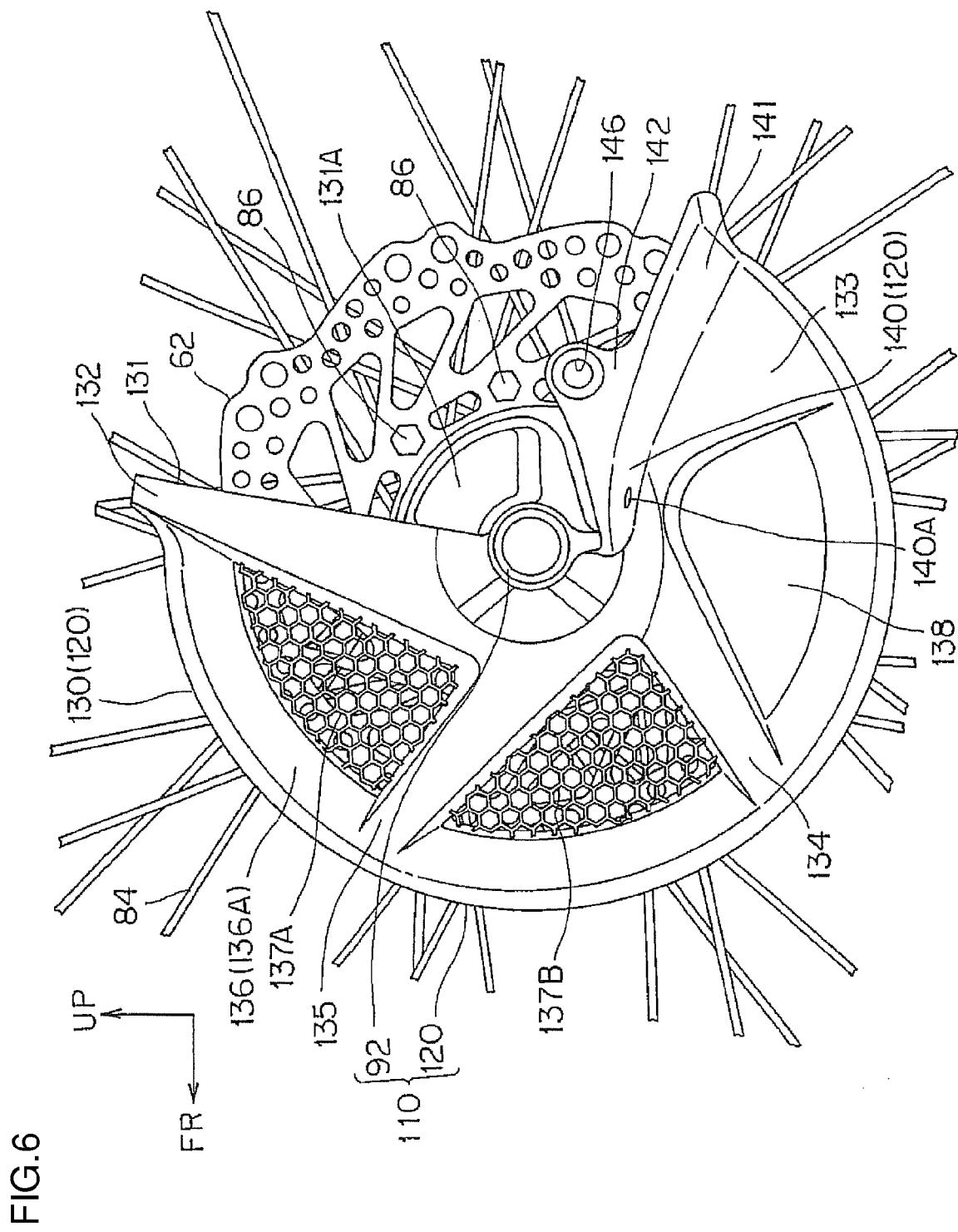
FIG. 6 is a side elevational view showing a condition, in which a disc brake cover is mounted on the front wheel shown in FIG. 5.
Figure 7:
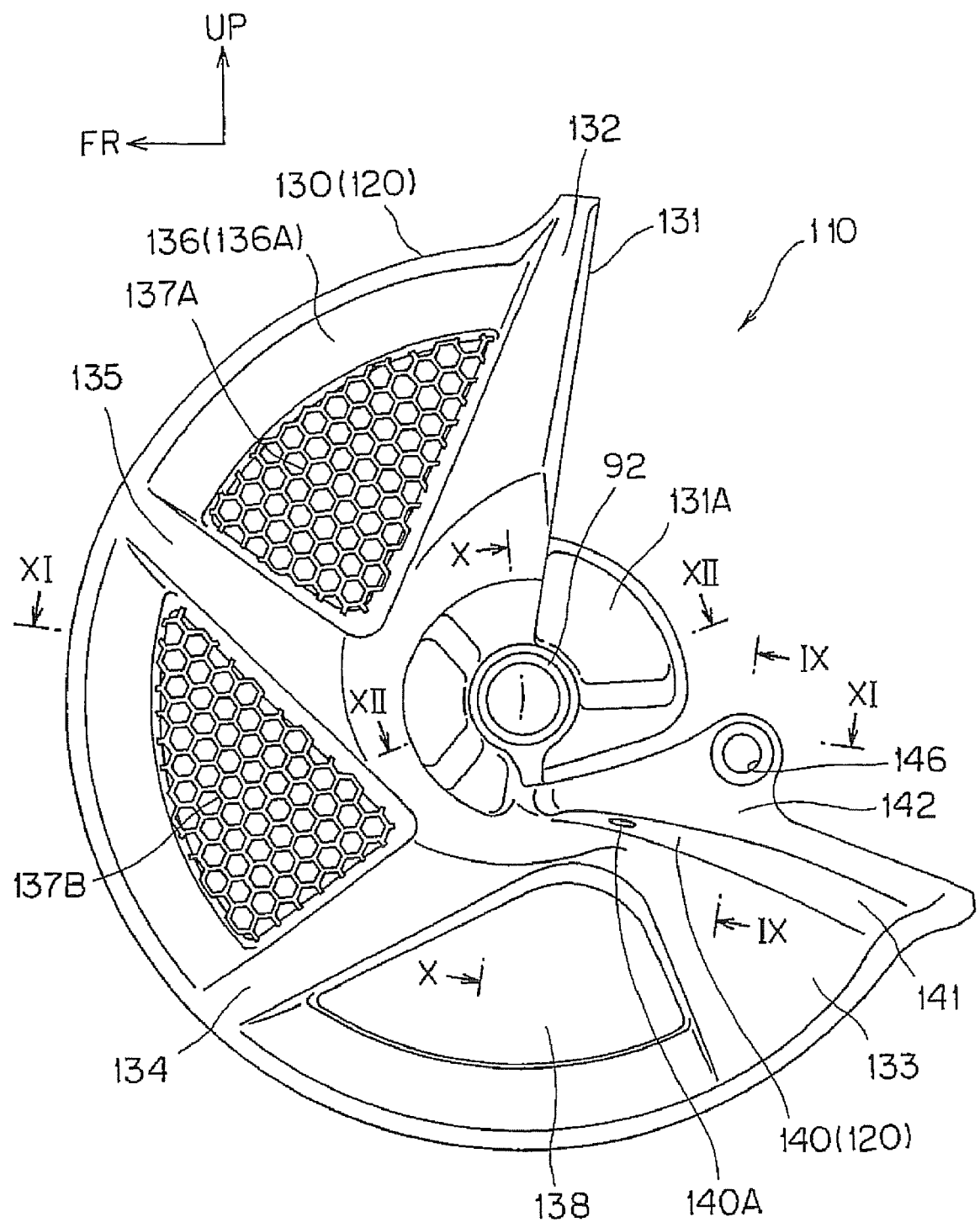
FIG. 7 is a plan view showing the disc brake cover.

The disc brake cover 110 will be described below. FIG. 6 is a side elevational view showing a condition, in which the disc brake cover 110 is mounted on the front wheel 24 shown in FIG. 5. FIG. 7 is a plan view showing the disc brake cover 110.

The disc brake cover 110 according to the embodiment of the present invention includes a protection cover 120 covering the front wheel disc brake 61, and the wheel collar 92. Referring to FIGS. 6 and 7, the protection cover 120 includes a rotor cover portion 130 and an extension portion 140. The rotor cover portion 130 extends from an outer periphery of the wheel collar 92 to cover the rotor 62. The extension portion 140 extends from the rotor cover portion 130 in the vehicle width direction at a position downward of the axle holder 51.

The protection cover 120 is formed as a resin molding integrating the rotor cover portion 130 with the extension portion 140, structured integrally with the wheel collar 92 made of metal. Specifically, when the disc brake cover 110 is to be manufactured, the metallic wheel collar 92 is manufactured in advance and the wheel collar 92 is disposed at a predetermined position in a mold of the protection cover 120. Under the foregoing condition, injection molding that injects a pellet-like resin material is performed to make the disc brake cover 110. As a result, the metallic wheel collar 92 and the plastic protection cover 120 can be joined together easily upon molding the protection cover 120. Note that the wheel collar 92 and the protection cover 120 may be formed separately first and be thereafter joined together into an integrated part through, for example, press-fitting or other connection method. Further, the wheel collar 92 may have an outer peripheral surface that is knurled for preventing the protection cover 120 from slipping.

The rotor cover portion 130 extends from the outer periphery of the wheel collar 92 so as to cover the rotor 62. The rotor cover portion 130 is formed substantially into a sector having a cutout portion (opening portion) 131 that opens in a range corresponding to that from the front fork 23 (including the axle holder 51 and the caliper support portion 56) to the caliper 63. The rotor cover portion 130 includes an upper frame portion 132, a rear frame portion 133, a front lower frame portion 134, and a front upper frame portion 135. More specifically, the upper frame portion 132 and the rear frame portion 133 are formed at portions corresponding to both sides of the cutout portion 131. The upper frame portion 132 extends from the wheel collar 92 along the fork cover 53 (see FIG. 2). The rear frame portion 133 extends from the wheel collar 92 toward a lower portion of the caliper 63 in an area downward of the axle holder 51 (see FIG. 2), obliquely downwardly toward the rear. The front lower frame portion 134 extends from the wheel collar 92 obliquely downwardly toward the front. The front upper frame portion 135 extends from the wheel collar 92 obliquely upwardly toward the front. In addition, the rotor cover portion 130 further includes an edge portion cover portion 136 and a hub cover portion 131A formed thereon. The edge portion cover portion 136 extends so as to connect leading end portions of the above-described four frame portions 132 to 135, thereby covering an outer peripheral edge portion of the rotor 62. The hub cover portion 131A extends on an inner peripheral side of the cutout portion 131 so as to cover the hub 81.

Figure 8:
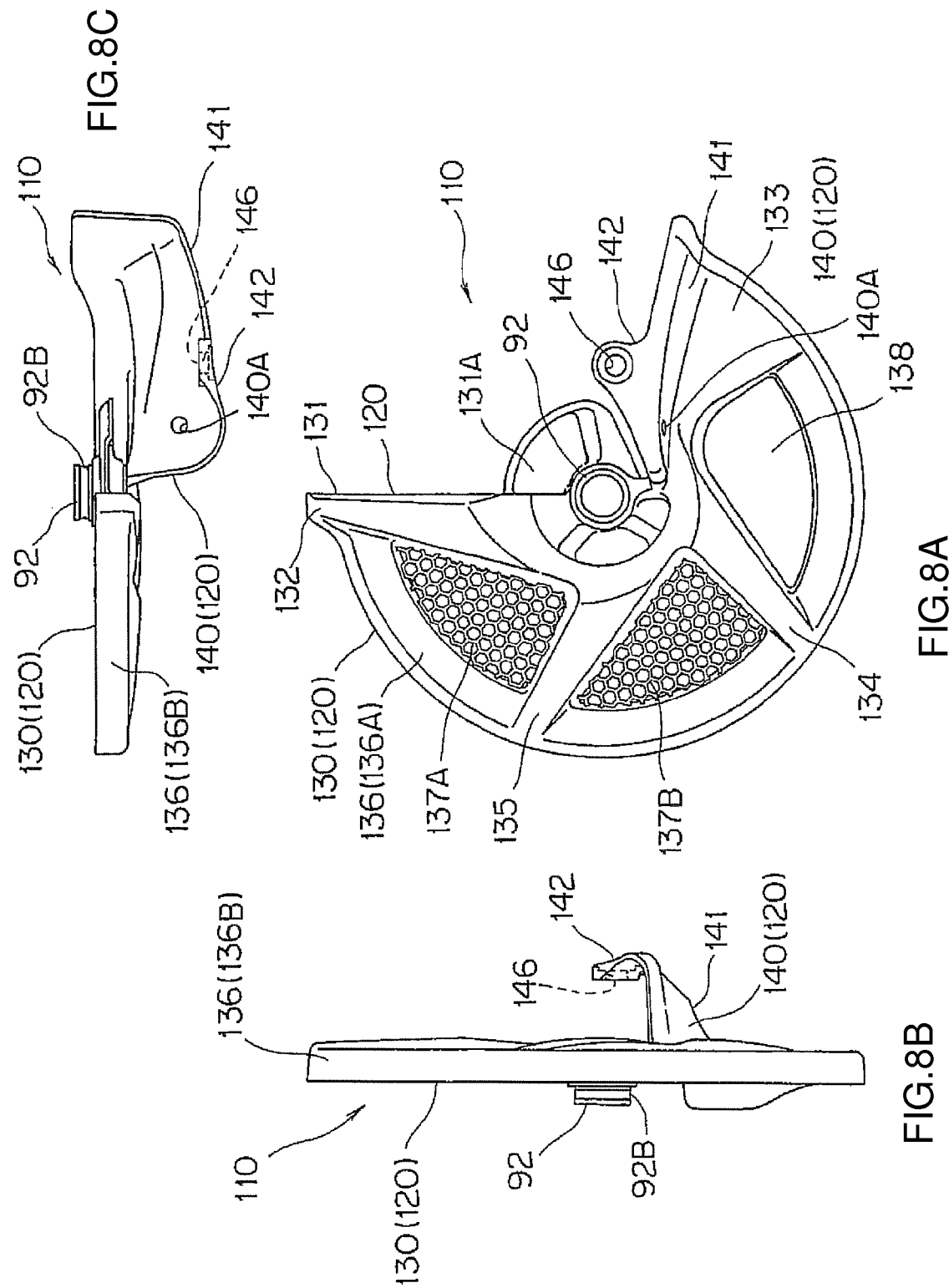
FIG. 8A is a plan view showing the disc brake cover.
FIG. 8B is a front view showing the disc brake cover.
FIG. 8C is a top view showing the disc brake cover.

FIGS. 8A to 8C are three-view drawings showing the disc brake cover 110, FIG. 8A being a plan view, FIG. 8B being a front view, and FIG. 8C being a top view. As shown in FIGS. 8A to 8C, the edge portion cover portion 136 includes a side face cover portion 136A and an end face cover portion 136B. Specifically, the side face cover portion 136A covers a side surface of an outer peripheral edge portion of the rotor 62. The end face cover portion 136B bends inwardly of the vehicle width direction from the side face cover portion 136A to cover an end face of the rotor 62. The side face cover portion 136A and the end face cover portion 136B together protect the rotor 62. While covering the end face of the rotor 62 and portions thereof surrounding therearound, the edge portion cover portion 136 opens the inward side of the rotor 62 in the vehicle width direction. This helps make the rotor 62 that is heated by a friction force with the brake pad cool easily.

In addition, the rotor cover portion 130 includes honeycomb net portions 137A, 137B formed therein to allow air to circulate therethrough. The net portions 137A, 137B are disposed between the upper frame portion 132 and the front upper frame portion 135, and between the front upper frame portion 135 and the front lower frame portion 134, respectively, of the rotor cover portion 130. The net portions 137A, 137B achieves good cooling performance for the rotor 62, while improving stiffness of the opening portion of the rotor cover portion 130 and design quality. Openings in the net portions 137A, 137B are formed to be small enough to shut down pebbles or mud. The portion between the front lower frame portion 134 and the rear frame portion 133 of the rotor cover portion 130 is, on the other hand, closed by a blocking member 138, which enhances strength of a lower half portion of the rotor cover portion 130.

The extension portion 140 extending from the rotor cover portion 130 in the vehicle width direction includes a rearward extension portion 141 and a riser portion 142. Specifically, the rearward extension portion 141 extends rearwardly along a lower surface of the axle holder 51 to thereby cover a lower portion of the caliper 63. The riser portion 142 bends to stand upwardly from a left end portion of the extension portion 140 rearward of the axle shaft 52 (including a left end portion of the rearward extension portion 141). The riser portion 142 is fixed to the lower caliper support portion 56B of the caliper support portion 56 via a bolt 145.

Figure 9:
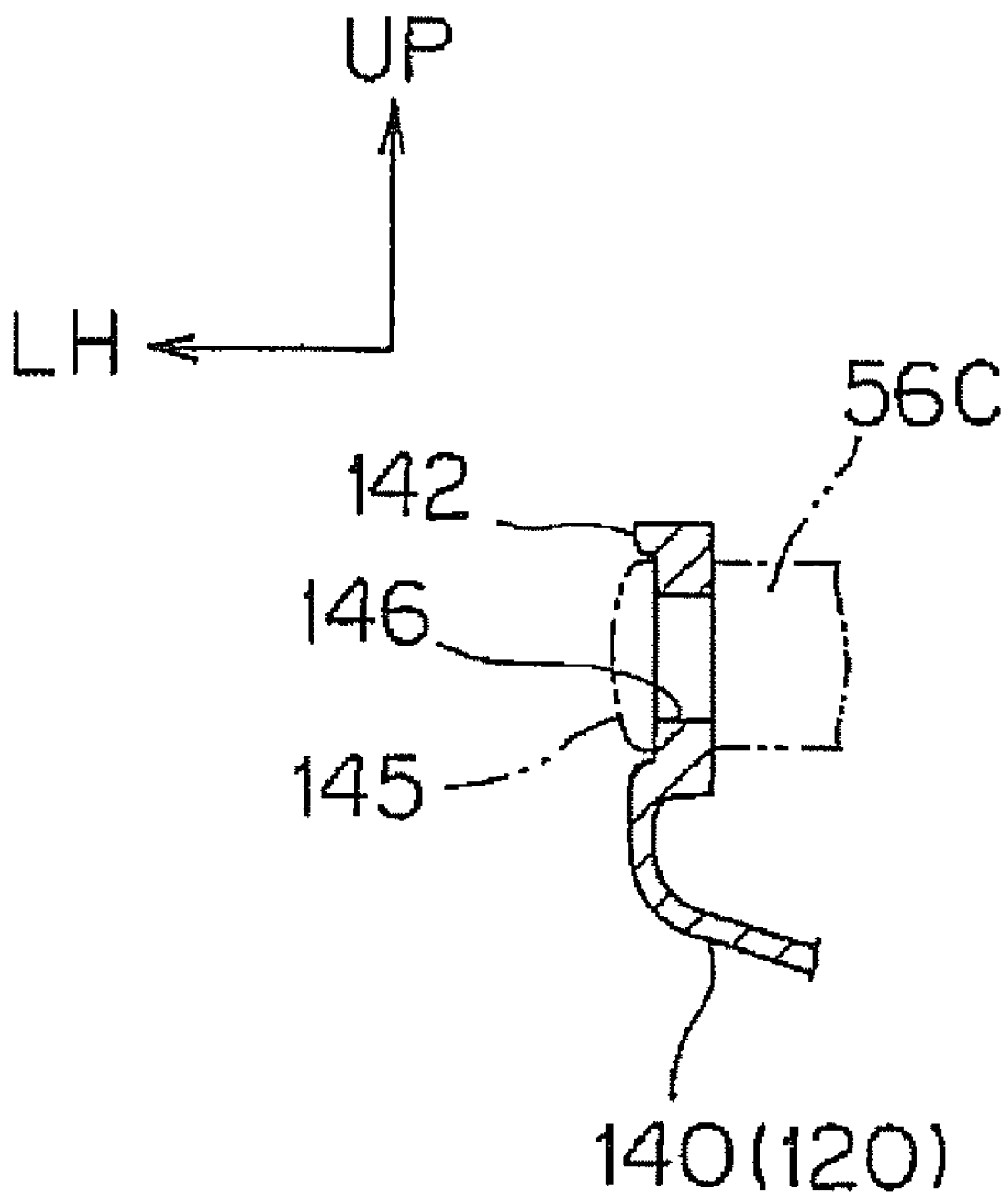
FIG. 9 is a cross-sectional view taken along line IX-IX of FIG. 7.

Note herein that FIG. 9 is a cross-sectional view taken along line IX-IX of FIG. 7. Referring to FIGS. 9 and 3, the lower caliper support portion 56B includes a protruding portion 56C that protrudes toward a bolt hole 146 in the riser portion 142. The riser portion 142 is supported via the bolt 145 and the protruding portion 56C on the lower caliper support portion 56B that is supported by the front fork 23 in a condition in which an inner surface of the riser portion 142 (around the bolt hole 146) abuts on an end face of the protruding portion 56C.

The extension portion 140 covers the lower portion of the axle holder 51 and the rearward extension portion 141 covers the lower portion of the caliper 63 as described above. The extension portion 140 can therefore prevent, for example, pebbles or mud from contacting the axle holder 51 and from contacting the caliper 63 rearward of the axle holder 51 from a downward direction of the axle holder 51. Further, the rearward extension portion 141 can prevent, for example, pebbles or mud from contacting the caliper 63 from a downward direction of the caliper 63. Specifically, the protection cover 120 can protect the axle holder 51 and the caliper 63.

The protection cover 120 is also supported by the riser portion 142 standing from the extension portion 140 at a position away from the axle shaft 52. The disc brake cover 110 having the protection cover 120 is supported at a total of two points on the front fork 23. Specifically, the disc brake cover 110 is supported by a supporting force of the wheel collar 92 that is clamped between the hub 81 of the front wheel 24 and the axle holder 51 and supported on the axle shaft 52 together with the front wheel 24. The disc brake cover 110 is also supported at a point away from this support portion in the vehicle longitudinal direction and the vehicle width direction.

Note that, in FIG. 7, reference numeral 140A denotes an access hole for a damper adjust of the front fork 23. The access hole 140A allows an adjustment to be made with the protection cover 120 installed. The access hole 140A also functions as a drain hole for discharging water that has flowed downwardly along the front fork 23 or the fork cover 53.

Figure 10:
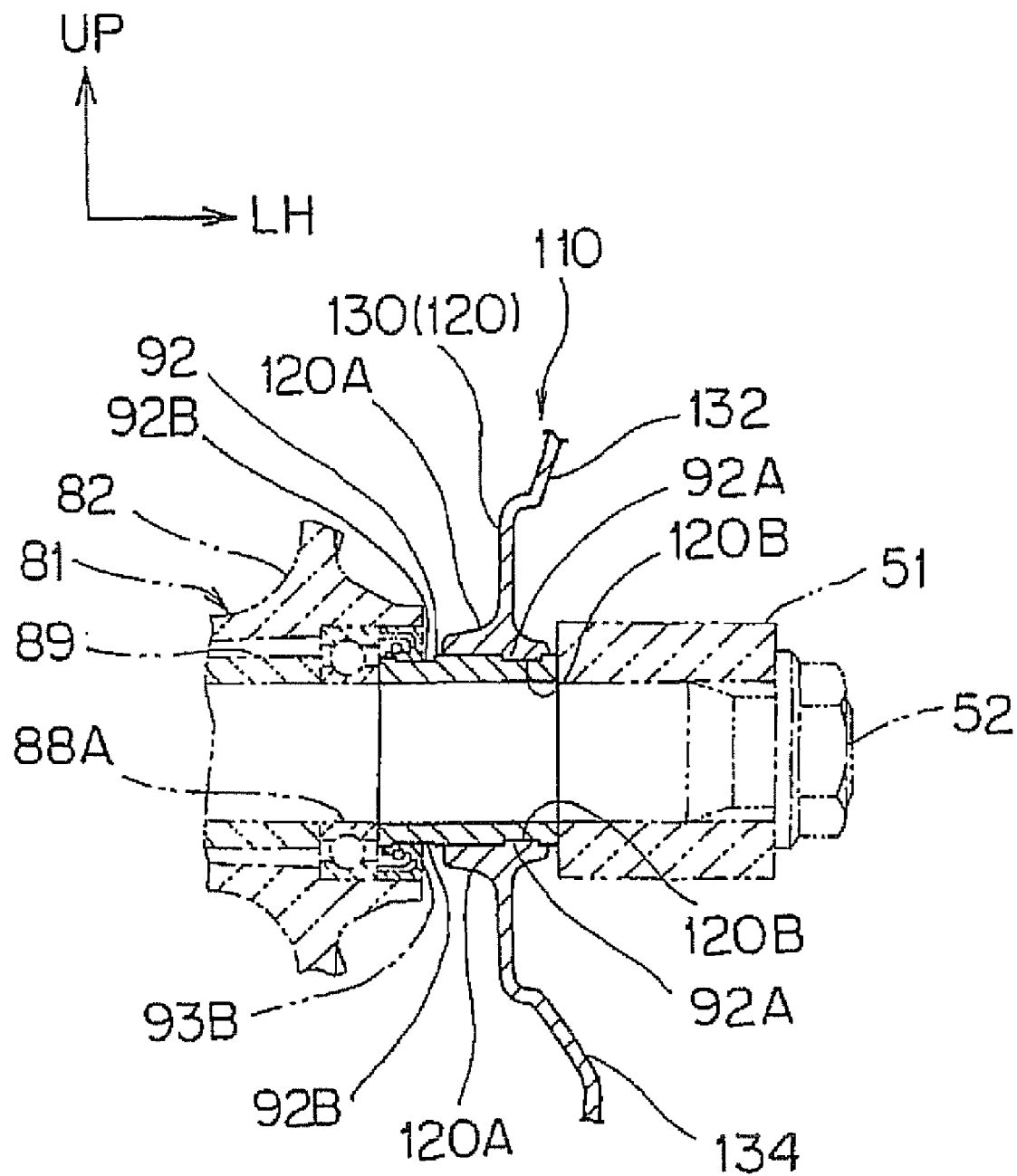
FIG. 10 is a cross-sectional view taken along line X-X of FIG. 7.
Figure 11:
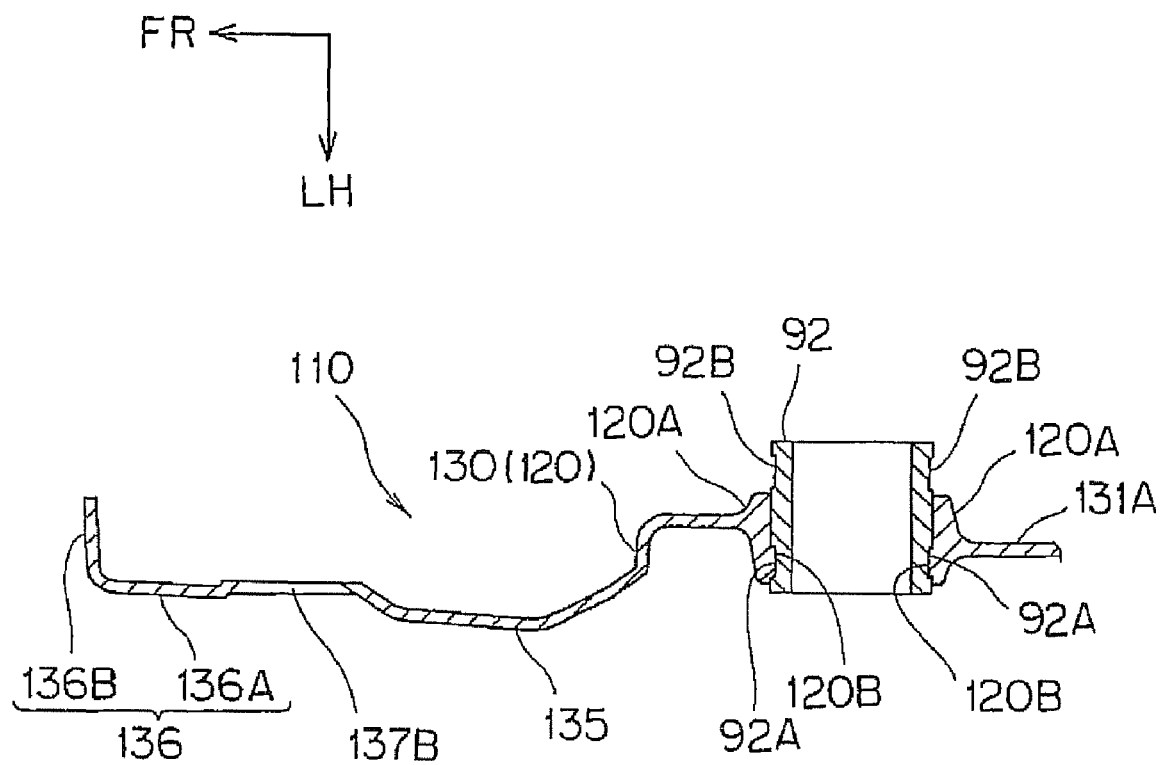
FIG. 11 is a cross-sectional view taken along line XI-XI of FIG. 7.
Figure 12:
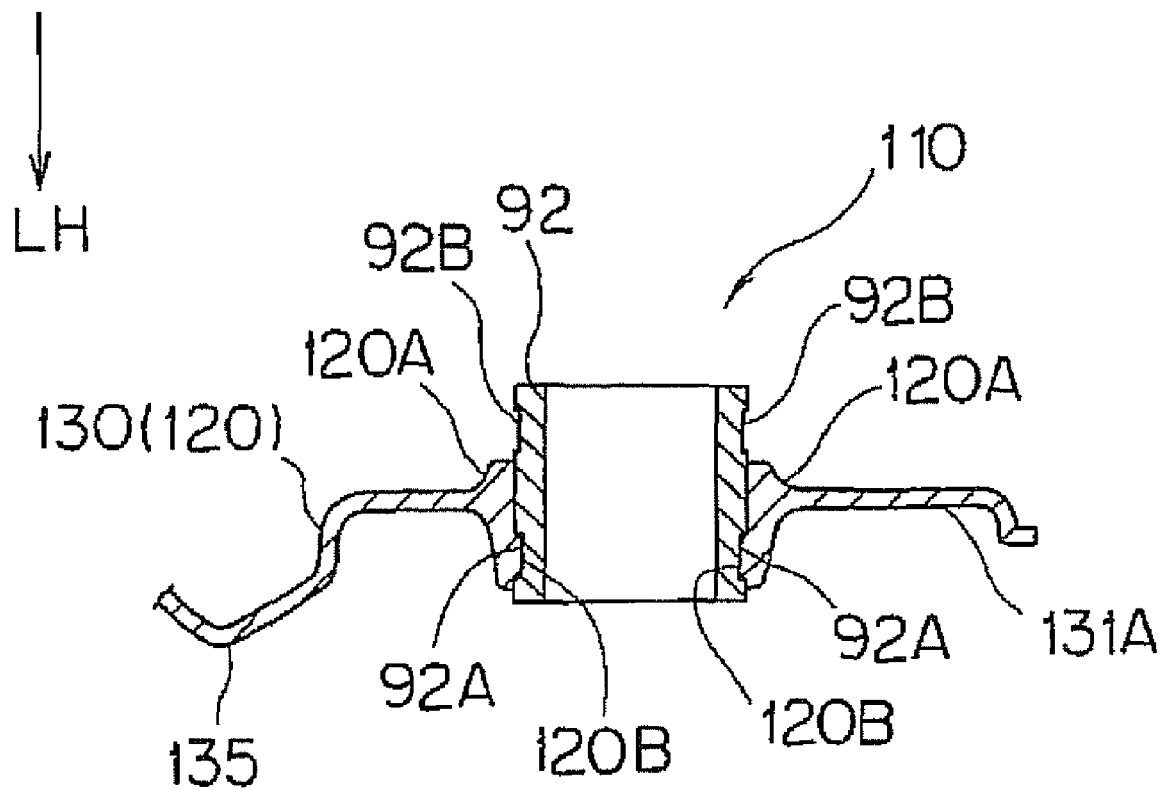
FIG. 12 is a cross-sectional view taken along line XII-XII of FIG. 7.

FIG. 10 is a cross-sectional view taken along line X-X of FIG. 7. FIG. 11 is a cross-sectional view taken along line XI-XI of FIG. 7. FIG. 12 is a cross-sectional view taken along line XII-XII of FIG. 7. As shown in FIGS. 10 through 12, the protection cover 120 has a proximal end portion 120A that extends further in the vehicle longitudinal direction than any other portions of the protection cover 120 so as to form a wider area of contact with the wheel collar 92. Further, the proximal end portion 120A has a protruding portion 120B that locks in a recess groove (recess portion) 92A previously formed in an outer periphery of the wheel collar 92 for correct positioning. This enhances connection strength (joint strength) between the protection cover 120 (rotor cover portion 130) and the wheel collar 92.

As shown in FIG. 10, the wheel collar 92 also includes a recess groove (recess portion) 92B in which the dust seal 93B is fitted to be positioned. The recess grooves 92A, 92B formed with a space therebetween in the longitudinal direction of the wheel collar 92 therefore correctly position the protection cover 120 (rotor cover portion 130) and the dust seal 93B, so that contact between the protection cover 120 and the dust seal 93B can be avoided.

In addition, each of the frame portions 132 to 135 of the protection cover 120 is formed into a bent cross-sectional shape extending first in the radial direction of the proximal end portion 120A and then bent to the right of the vehicle body to extend in the outside diameter direction. Specifically, the protection cover 120 is formed to offer a high modulus of section, which also enhances the strength of the protection cover 120.

As described heretofore, in accordance with the embodiment of the present invention, the protection cover 120 that constitutes the disc brake cover 110 is integrated with the wheel collar 92 that positions the front wheel 24 and supports the wheel collar 92 with the front wheel 24 on the axle shaft 52 by clamping the wheel collar 92 between the hub 81 of the front wheel 24 and the axle holder 51. This allows the supporting force of the wheel collar 92 to support the disc brake cover 110, so that support stiffness can be enhanced, the number of mounting portions of the disc brake cover 110 relative to the front fork 23 can be reduced, and the number of parts used can be reduced.

In addition, the protection cover 120 includes the extension portion 140 that extends in the vehicle width direction from the rotor cover portion 130 and the extension portion 140 is supported on the front fork 23 at a position away from the axle shaft 52. Sufficient support stiffness can therefore be achieved for the disc brake cover 110 with a two-point support at the axle shaft 52 and a position away therefrom.

Specifically, the disc brake cover 110 requires only one location for mounting on the front fork 23 (at which the disc brake cover 110 is bolted). This reduces the weight of the disc brake cover 110 and makes for easy removal and installation of the disc brake cover 110. For example, if the disc brake cover 110 (protection cover 120) is removed in advance from the front fork 23 during replacement of the front wheel 24, the disc brake cover 110 can be easily removed when the front wheel 24 is removed. With a racing vehicle, in particular, the front wheel 24 is to be removed and reinstalled at timing of, for example, before and after the race. At such timing of removal and installation, the disc brake cover 110 can be easily removed, which expedites the work.

The protection cover 120 includes the rotor cover portion 130 that extends from the outer periphery of the wheel collar 92 to cover the rotor 62 and the extension portion 140 that covers the lower portions of the axle holder 51 and the caliper 63, so that the front wheel disc brake 61 including the rotor 62 and the caliper 63, and the axle holder 51 can be protected.

Moreover, the rotor cover portion 130 includes the cutout portion (opening portion) 131 that opens in the range corresponding to the caliper 63. The front wheel disc brake 61 and the axle holder 51 can therefore be protected, while an increase in weight as a result of the protection cover 120 (disc brake cover 110) becoming larger in size can be inhibited. The caliper 63 can also be easily removed and reinstalled even with the disc brake cover 110 mounted in the vehicle. This also improves serviceability (maintainability).

The rotor cover portion 130 extends to a point near the fork cover 53 that covers the lower portion of the front fork 23 at the front side of the front fork 23 as shown in FIG. 2. The gap between the rotor cover portion 130 and the fork cover 53 can therefore be substantially blocked, which provides even more complete protection for the rotor 62.

Further, the rotor cover portion 130 of the disc brake cover 110 is locked in the recess groove 92A formed on the outer periphery of the wheel collar 92. This positions correctly the connection point between the rotor cover portion 130 and the wheel collar 92 and enhances the connection strength.

According to an embodiment of the present invention, the protection cover protecting the rotor is integrated with the wheel collar for positioning the front wheel and the wheel collar is supported with the front wheel on the support shaft by being clamped between the hub of the front wheel and the axle holder. This reduces the number of mounting points of the disc brake cover relative to the front fork, achieving reduction in weight and easy removal and installation of the disc brake cover.

The protection cover includes the rotor cover portion covering the rotor and the extension portion extending in the vehicle width direction at a position downward of the axle holder. The extension portion is supported on the front fork at a position away from the support shaft. The rotor and the axle holder can therefore be protected. Further, the disc brake cover is supported at two points, which ensures sufficient support.

Additionally, the caliper is disposed inside the outside surface of the front fork at a position rearward of the front fork and the extension portion includes the rearward extension portion extending rearwardly of the vehicle body along the lower surface of the axle holder to thereby cover the lower portion of the caliper. The caliper can therefore be protected.

The protection cover is also formed into a cover shape removably exposing the caliper. The caliper can therefore be easily removable and an increase in weight as a result of the disc brake cover becoming large can be avoided.

In addition, the disc brake cover structure further includes the fork cover covering the lower portion of the front fork at the front side of the caliper. The protection cover has the opening portion that opens in the range corresponding to that from the front fork to the caliper and the cover portion covering the rotor at the front side of the front fork extends up to a point near the fork cover. An increase in weight as a result of the disc brake cover becoming large can therefore be avoided. The gap between the disc brake cover and the fork cover can therefore be substantially blocked, which provides even more complete protection for the rotor.

The wheel collar includes the recess portion formed on the outer periphery thereof, in which the protection cover is locked. The connection point between the protection cover and the wheel collar can therefore be correctly positioned and the connection strength can be enhanced. The present invention has been described with reference to the preferred embodiment; however, the present invention is not limited to the disclosed embodiment, but also encompasses those changes falling within the spirit and scope of the appended claims. For example, in the above-described embodiment, the present invention is applied to the disc brake cover structure of the off-road type motorcycle 100. The present invention can be widely applied not only to the foregoing arrangement, but also to a disc brake cover structure of a vehicle having a disc brake.

What is claimed as new and desired to be secured by Letters Patent of the United States is:

1. A disc brake cover structure for a vehicle, comprising:
    a protection cover to protect a rotor of a disc brake disposed at a front wheel of a vehicle, the front wheel being rotatably supported via a support shaft between first and second axle holders disposed at a front fork, the protection cover comprising:
    a rotor cover portion to cover the rotor; and
    a first extension portion extending toward an opposite side to the front wheel from the rotor cover to cover a lower portion of a caliper provided in the disc brake, the lower portion of the caliper being provided between the first extension portion and the front wheel in a vehicle width direction of the vehicle; and
    a wheel collar to be supported on the support shaft to position the front wheel and connected to the protection cover, the wheel collar being arranged to be sandwiched between a hub of the front wheel and either one of the first and second axle holders.

2. The disc brake cover structure according to claim 1, wherein
    the first extension portion is disposed at a downward position with respect to the first and second axle holders, the first extension portion being to be supported by the front fork at a position away from the support shaft.

3. The disc brake cover structure according to claim 2,
    wherein the caliper disposed at the front fork inside an outside surface of the front fork at a rearward position with respect to the front fork; and
    wherein the first extension portion includes a rearward extension portion extending rearward with respect to the vehicle along a lower surface of the first and second axle holders to cover the lower portion of the caliper.

4. The disc brake cover structure according to claim 3,
wherein the disc brake comprises the caliper which is supported at a caliper support portion disposed at the front fork, and
wherein the protection cover is so structured that the caliper is exposed to be removable.

5. The disc brake cover structure according to claim 3, further comprising:
a fork cover covering a lower portion of the front fork at a front position with respect to the caliper provided at the front fork,
wherein the protection cover has an opening portion including an area extending from the front fork to the caliper, and
wherein the rotor cover portion to cover the rotor at a front side with respect to the front fork extends to a point in a vicinity of the fork cover.

6. The disc brake cover structure according to claim 3, wherein the wheel collar includes a recess portion formed on an outer periphery of the wheel collar, the protection cover being connected to the wheel collar at the recess portion.

7. The disc brake cover structure according to claim 2, wherein the wheel collar includes a recess portion formed on an outer periphery of the wheel collar, the protection cover being connected to the wheel collar at the recess portion.

8. The disc brake cover structure according to claim 2,
wherein the disc brake comprises the caliper which is supported at a caliper support portion disposed at the front fork, and
wherein the protection cover is so structured that the caliper is exposed to be removable.

9. The disc brake cover structure according to claim 2, further comprising:
a fork cover covering a lower portion of the front fork at a front position with respect to the caliper provided at the front fork,
wherein the protection cover has an opening portion including an area extending from the front fork to the caliper, and
wherein the rotor cover portion to cover the rotor at a front side with respect to the front fork extends to a point in a vicinity of the fork cover.

10. The disc brake cover structure according to claim 1, wherein a maximum outer diameter of the protection cover is greater than a maximum outer diameter of the rotor.

11. The disc brake cover structure according to claim 1, wherein the protection cover further comprise a second extension portion extending in the vehicle width direction of the vehicle from a radially outer portion of the rotor cover portion and provided radially outward of the rotor.

12. The disc brake cover structure according to claim 1, wherein
the first extension portion includes a first portion extending in the vehicle width direction of the vehicle from the rotor cover, and a second portion extending upwardly from the first portion, the lower portion of the caliper being provided between the front wheel and the second portion, and
the second portion is connected to a caliper support portion disposed at the front fork, the caliper being connected to the caliper support portion.

13. The disc brake cover structure according to claim 1, wherein the wheel collar includes a recess portion formed on an outer periphery of the wheel collar, the protection cover being connected to the wheel collar at the recess portion.

14. The disc brake cover structure according to claim 1, further comprising:
a fork cover covering a lower portion of the front fork at a front position with respect to the caliper provided at the front fork,
wherein the protection cover has an opening portion including an area extending from the front fork to the caliper; and
wherein the rotor cover portion to cover the rotor at a front side with respect to the front fork extends to a point in a vicinity of the fork cover.

15. The disc brake cover structure according to claim 14, wherein the wheel collar includes a recess portion formed on an outer periphery of the wheel collar, the protection cover being connected to the wheel collar at the recess portion.

16. The disc brake cover structure according to claim 1,
wherein the caliper is supported at a caliper support portion disposed at the front fork, and
wherein the protection cover is so structured that the caliper is exposed to be removable.

17. The disc brake cover structure according to claim 16, further comprising:
a fork cover covering a lower portion of the front fork at a front position with respect to the caliper provided at the front fork,
wherein the protection cover has an opening portion including an area extending from the front fork to the caliper, and
wherein the rotor cover portion to cover the rotor at a front side with respect to the front fork extends to a point in a vicinity of the fork cover.

18. The disc brake cover structure according to claim 16, wherein the wheel collar includes a recess portion formed on an outer periphery of the wheel collar, the protection cover being connected to the wheel collar at the recess portion.

19. A vehicle comprising:
a front wheel comprising a hub and rotatably supported at the hub via a support shaft between first and second axle holders disposed at a front fork;
a disc brake disposed at the front wheel and comprising a rotor and a caliper;
a protection cover to protect the rotor of the disc brake, the protection cover comprising:
a rotor cover portion to cover the rotor; and
a first extension portion extending toward an opposite side to the front wheel from the rotor cover to cover a lower portion of the caliper, the lower portion of the caliper being provided between the first extension portion and the front wheel in a vehicle width direction of the vehicle; and
a wheel collar supported on the support shaft to position the front wheel and connected to the protection cover, the wheel collar being arranged to be sandwiched between the hub of the front wheel and either one of the first and second axle holders.

20. The vehicle according to claim 19, wherein
the first extension portion includes a first portion extending in a vehicle width direction of the vehicle from the rotor cover, and a second portion extending upwardly from the first portion, the lower portion of the caliper being provided between the front wheel and the second portion, and
the second portion is connected to a caliper support portion disposed at the front fork, the caliper being connected to the caliper support portion.

* * * * *